US007028040B1

(12) United States Patent
Butler et al.

(10) Patent No.: US 7,028,040 B1
(45) Date of Patent: Apr. 11, 2006

(54) METHOD AND SYSTEM FOR INCREMENTALLY MAINTAINING DIGITAL CONTENT USING EVENTS

(75) Inventors: Stephen John Butler, Chichester (GB); Graham Andrew Ruffell, London (GB)

(73) Assignee: Microsoft Corporation, Redmond, WA (US)

( * ) Notice: Subject to any disclaimer, the term of this patent is extended or adjusted under 35 U.S.C. 154(b) by 531 days.

(21) Appl. No.: 09/859,986

(22) Filed: May 17, 2001

(51) Int. Cl.
*G06F 7/00* (2006.01)

(52) U.S. Cl. ....................................... 707/101; 370/257

(58) Field of Classification Search .................... 707/8, 707/101–103 R, 1–10, 701, 201–203; 709/218, 709/204, 203; 370/257
See application file for complete search history.

(56) References Cited

U.S. PATENT DOCUMENTS 6,356,903 B1 * 3/2002 Baxter et al. ................. 707/10
6,404,921 B1 * 6/2002 Ishida ........................ 382/197
6,449,623 B1 * 9/2002 Bohannon et al. .......... 707/202
6,535,498 B1 * 3/2003 Larsson et al. ............. 370/338
6,542,474 B1 * 4/2003 Lau ........................... 370/257
2002/0078142 A1 * 6/2002 Moore et al.
2003/0189593 A1 * 10/2003 Yarvin

* cited by examiner

*Primary Examiner*—Mohammad Ali
*Assistant Examiner*—Sathyanarayan Pannala
(74) *Attorney, Agent, or Firm*—Shook, Hardy & Bacon L.L.P.

(57) ABSTRACT

A method and system are provided for incrementally maintaining digital information using change notifications. A content store provides change notifications corresponding to changes to the data within the store to an event broadcaster. One or more modules store a subset of the content data for publication and receive the change notifications over a message queue bus. The modules process the change notifications and generate events for redistribution by the event broadcaster. The events may include publishing updated content by the modules.

23 Claims, 3 Drawing Sheets

METHOD AND SYSTEM FOR INCREMENTALLY MAINTAINING DIGITAL CONTENT USING EVENTS

TECHNICAL FIELD

The present invention relates generally to computer software and, more particularly, to a method and system for incrementally maintaining digital content using change notifications.

BACKGROUND OF THE INVENTION

Conventional content management systems operate using a general purpose content store for storing information that is output and published in traditional Internet space. Content managers are popular for managing large volumes of data for publication on the Internet. They provide users a consolidated place to manage content coming in from various feeds. Content managers also provide numerous services before publishing the inputted data. Some of these services include versioning and templating. Content manager services also include content management tools that provide users the ability to manage the editorial and publishing process for one or more Internet web sites.

Content management systems differ from document management systems in that content managers tend to repurpose the content stored within its data store. Document management systems typically provide users the ability to perform tasks on entire documents. In such systems, documents are reviewed, approved, and edited, but the document retains its form. Content management systems on the other hand, manage discrete pieces of information that may be placed together to form desired outputs or documents. For example, a user may place multiple pieces of news information together to form a news column that is output to a particular platform. Alternatively, the user may take a subset of that same news information to form a news article for another platform. The same pieces of news information are repurposed and published depending upon the desired output.

Content managers also function to take portions of the information stored within its content store and repurpose that information in a variety of different formats. Data within the content store may be transformed by the content manager to produce extensible mark-up language (XML) versions, hypertext mark-up language (HTML) versions, versions for mobile users utilizing wireless communications devices, as well as an assortment of formats for traditional media. Content managers take heterogeneous pieces of information to produce customized outputs as desired for individual users.

Content managers typically have two broad systems to assist them in performing their tasks. First, content managers include systems to place information and content into their database. Second, they have systems that perform various transformation steps that allow the stored content to be repurposed for various output configurations. Content managers in a global computer network or Internet space frequently produce output based upon information that is stored in their database on a regular basis. These outputs could be uniform, but more frequently vary slightly from one another. As information is changed in the content manager database, one of the content manager's functions is to ensure that the latest information is output or published. Conventional content managers republish entire pages or even larger units of work when a portion of that page needs to be updated on the output platform.

Conventional content manager databases or content stores are generic in nature. That is, the data that is stored in the database must be formatted in such a way so that the data may be used on a variety of different platforms or applications. Traditionally, the content store does not track or know of the various outputs for the data it is storing. Traditional publishing systems within the content manager pull the pieces of information within the database that it wants and then renders that information over the global computer network. As mentioned above, this information is typically reproduced on a regular basis. Further, the same information may be output over a variety of different platforms and networks with each of those platforms requiring the output contain varying pieces of information from the database. The content store is not in a position to recognize all of the possible outputs and all the potential interrelationships between the data it is storing.

Conventional content management systems are structured such that it is prohibitive to incrementally update content on a global computer network. More specifically, the designer of the content store system cannot know in advance what the various formats of data are that are stored in the content store system. Therefore, it is exceedingly difficult for the designer to provide generic services that do dependency analysis or the like. As a consequence, in existing systems, it is very difficult, if not impossible, to build into the system general purpose functionality for republishing data on an as-needed basis. Instead, large units or trees are republished in a somewhat manual fashion. Alternatively, users of a content management system build elaborate dependency analysis systems on top of the content management system which do the updating. As is apparent, this is not very efficient for the user, both in terms of dependent development time and processing time.

Accordingly, there exists a need to update content on a global computer network such that only the content that has changed between the present time period and the previous time period is updated at the output. Moreover, there is a need for such a method and system that allows for surgical updates of the data presented to a user while maintaining the generic nature of the content store. Further, there is a need for a system that utilizes output modules that have domain specific knowledge of its particular output space such that it becomes efficient to update only portions of the content that has changed.

SUMMARY OF THE INVENTION

Generally described, a method in a computer system is provided for incrementally updating digital information on a global computer network. In accordance with the method, a change notification is issued from a content store. The content store has information to be published on a computer network and the change notification corresponds to a change in the content store information. The change notification is then broadcasted to one or more modules and one or more events associated with the change notification are initiated by the one or more modules to incrementally update the digital information.

In another aspect of the present invention, a computer system is provided for incrementally updating digital content using change notifications on a global computer network. The system includes a content store that stores content data and generates change notifications associated with changes occurring with the content data. The system also includes one or more modules that have a memory and each of the modules generates events. Additionally, the system includes a broadcaster that receives the change notifications and events and broadcasts the change notifications and events to the one or more modules to incrementally update the content data stored within the modules.

A method and system are provided for incrementally maintaining digital information using change notifications. A content store provides change notifications corresponding to changes to the data within the store to an event broadcaster. One or more modules store a subset of the content data for publication and receive the change notifications over a message queue bus. The modules process the change notifications and generate events for redistribution by the event broadcaster. The events may include publishing updated content by the modules.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
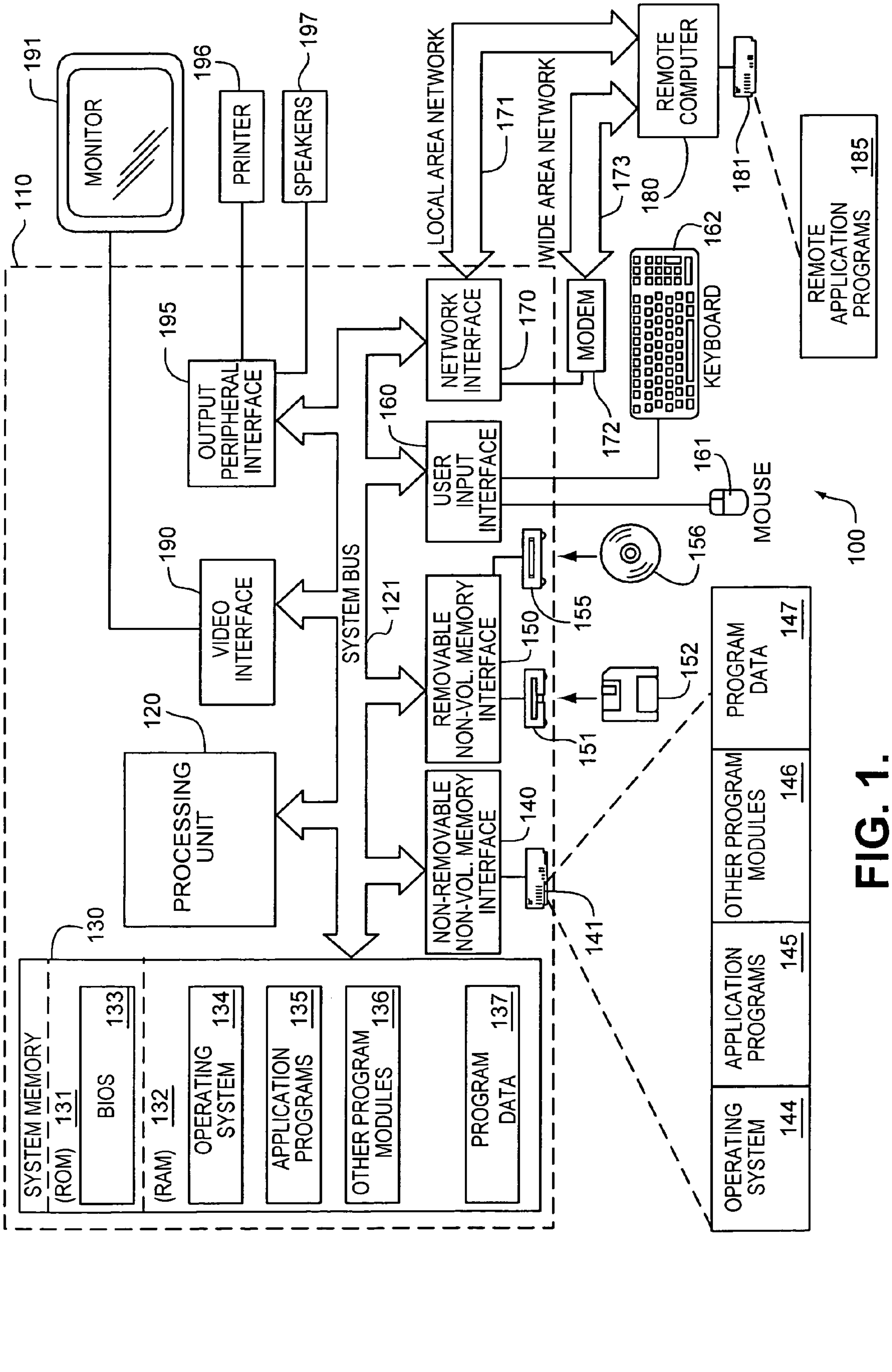
FIG. 1 is a block diagram of a computing system environment suitable for use in implementing the present invention.

The present invention provides a method and system for incrementally maintaining digital information on a network using change notifications. FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 141, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 132.

The present invention provides a method and system for incrementally maintaining digital content in a global computer network by implementing change notifications in a content store. Although the method and system are described as being implemented into a "WINDOWS" operating system by "MICROSOFT", one skilled in the art would recognize that the method and system could be implemented in any system supporting a content store that provides an event to an interested party that indicates a change in the content store.

Figure 2:
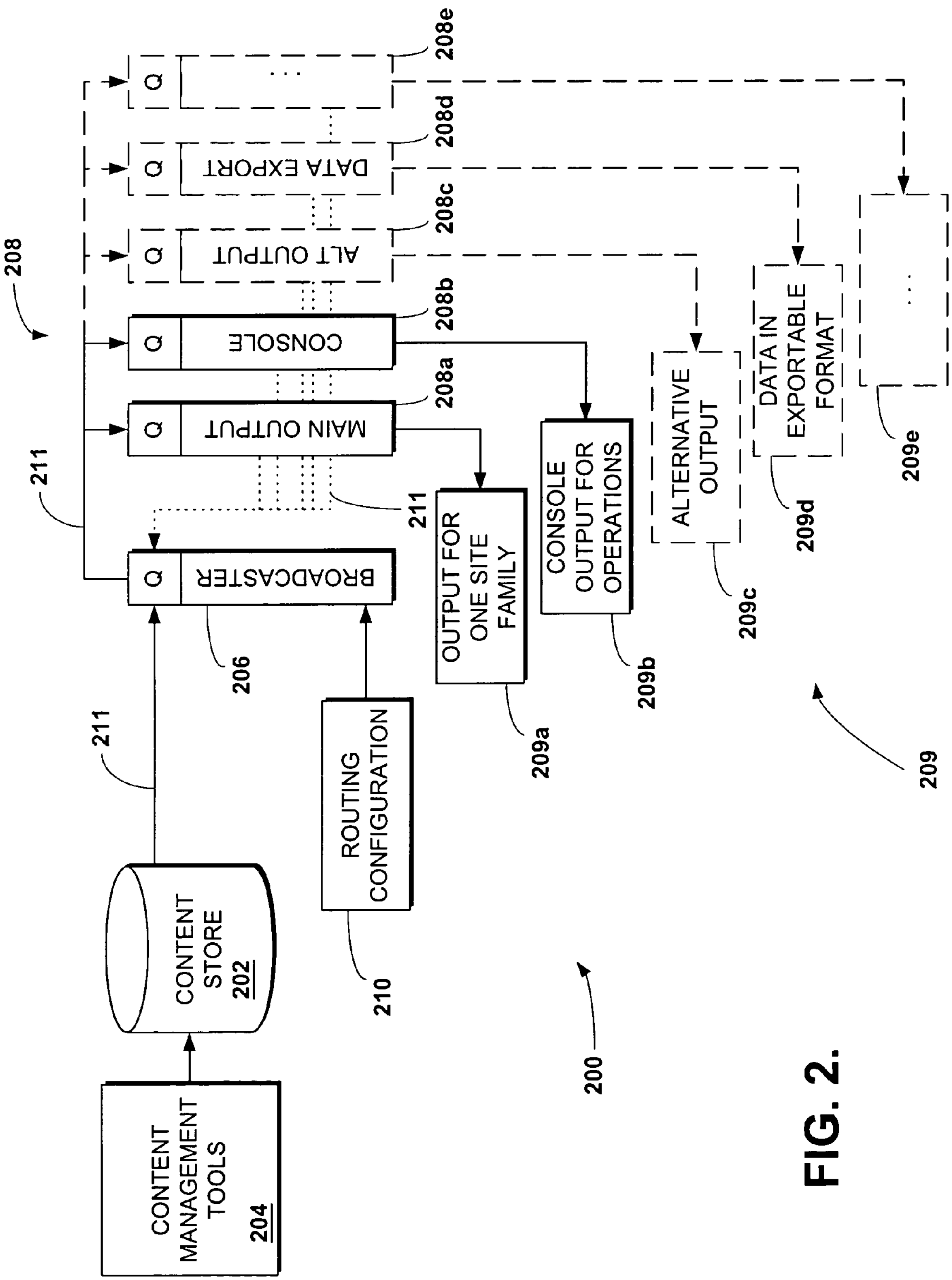
FIG. 2 is a block diagram illustrating the components used in a preferred embodiment of the present invention.

Turning now to FIG. 2, a block diagram is provided that illustrates the basic components of the present invention. A content store 202 is a database within a content management system 200 that contains information that is typically published in a web-based environment. The content manager system 200, using traditional content management tools 204, transforms the content within the store 202 to make the necessary outputs. Conventional transformations used for publishing include, but are not limited to, hypertext markup language (HTML) versions and extensible markup language (XML) versions.

As mentioned above, the present invention provides change notifications by the content store whenever any piece of information within the content store 202 is changed. The change notification or event is provided to an event broadcaster 206 that informs interested parties of the change to the content within the content store 202. The interested parties may include one or more modules 208 that serve to provide output or publishing information from the content store or provide other functions that will be discussed in greater detail below that are useful to operators and users of publishing systems. The modules provide this data to an appropriate outlet 209 for publishing or further processing.

The present invention also provides a message queue 211 or bus as a central system. Preferably, the message bus 211 is Microsoft Message Queue (MSMQ) Server available from "MICROSOFT." The message queue 211 routes the change notifications sent by the content store and received by the broadcaster 206. The queue 211 is also utilized by the broadcaster 206 to send the change notifications to modules 208 interested in receiving notifications for the event that occurred within the content store 202. When a module 208 receives a message from the message queue 211, it may perform the task at that time or it may create a new event that is placed onto the message queue 211 that is sent back to the broadcaster 206 for redistribution. The broadcaster 206 then may take that new event and send it on to the particular module that will perform the work. As will be further described below, these modules are able to refine, enhance, upgrade, downgrade, or apply other semantic transformations to the raw change notifications so that high level extractions can be accomplished.

The modules 208 are created by users wishing to perform a task related to the information within the content store 202. Each module 208 contains its own memory and message queue. As mentioned above, the system 200 may include one or more modules 208 that perform publishing operations or other functions that are not associated with traditional publishing. One of modules 208 may be an output module 208*a* that provides output for a one site family 209*a*. Another module may be a console module 208*b* that provides information to a user at a console output 209*b*. This type of module may subscribe to any type of message to keep statistics on all traffic occurring on the message bus. An alternative output module 208*c* may be written by users to track a variety of statistics that may occur on the message bus 211 that is provided using a suitable output 209*c*. For example, a user may wish to track the frequency of a change occurring with an article. A module 208*d* may also be set up to serve as a data export vehicle to provide data within the content store to users in an exportable data format 209*d*. As illustrated with blocks 208*e* and 209*e*, the message queue offers great flexibility in that it allows for numerous modules to be added to the bus 211. The extensible nature of the system presents numerous capabilities and advantages that will be discussed in greater detail below.

The broadcaster 206 utilizes routing component 210 that has routing configuration information linking the interested parties to the types of messages they wish to receive. Preferably, a file is read when the system 200 is initialized that indicates which modules are registered for what types of messages. Alternatively, upon initialization of a module, the module may provide the broadcaster with the routing information at that time.

The present invention typically runs over a network. This network may be a local network such as a local network (LAN) or a global computer network, such as the Internet or World Wide Web. As such, it may be established in any distributed system. That is, all of the components illustrated in FIG. 2 may reside in one processor or one or more of the components may reside on separate processors or platforms. Thus, the creation of the message bus allows you to coordinate activities between different modules.

Figure 3:
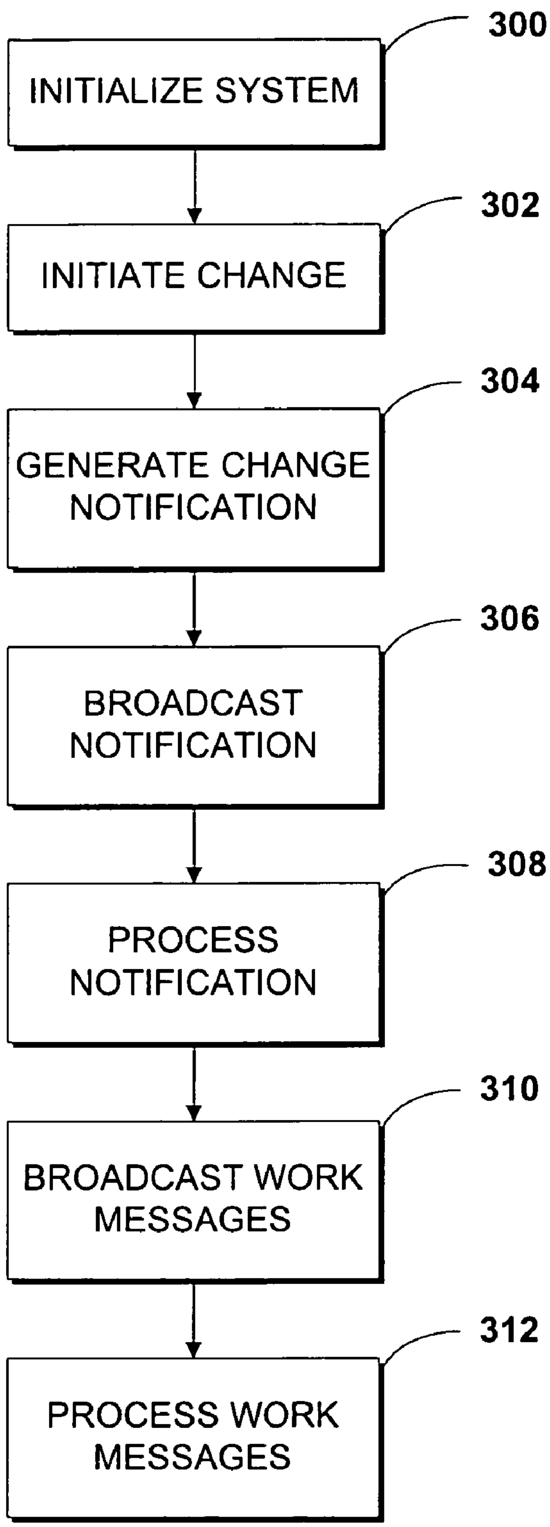
FIG. 3 is a flow diagram illustrating a preferred method for incrementally maintaining digital information in accordance with the present invention.

Referring now to FIG. 3, a flow diagram illustrating a preferred method for implementing the present invention is provided. At step 300, the content management system 200 is initialized and begins operation. The modules load information of interest from the content store and store this data within their own memory. The modules then wait and listen for change notifications occurring on the message queue. Also during initialization, as noted above, the modules subscribe with the routing component 210 and broadcaster 206 to receive change notifications of interest. For example, one output module may be interested in receiving news information occurring in one region of the world. The content store may be a general news service that provides news information on a global basis. The output module would then register for change notifications in the data within the content store concerning news events within that particular region. When a news article is updated within the content store, a change notification is sent to the broadcaster. The broadcaster then determines who may by interested in that particular change in the article. If the article is of interest to the output module then the broadcaster sends a message to that particular module that a change has occurred.

At step 302, a change is initiated within the content store. This may include an automatic data feed that is updated or a user manually typing in new information. For example, an automatic feed may be a news broadcast or scores from a sporting event. Manually written information may include a news article or a picture. It does not matter to the system whether the change occurred manually or otherwise. Change notifications are always generated automatically. It is preferable for the system to not distinguish between manual and automated changes. For example, the system periodically checks or polls a schedule of the components to determine when the components are to go on-line and/or off-line. This polling determines whether there have been any logical changes to the content merely due to the passage of time. Change notifications are generated to indicate which content items are now on-line because it is time for them to be on-line. Similarly, items may be replaced due to passage of a particular time. For instance, at noon on any particular day, it may be advantageous to switch the content from morning news to afternoon news. Still further, it may be desirable to have a notification to indicate that a particular content has expired. For instance, after a morning rush hour, it would no longer be necessary to display content related to traffic.

At step 304, a change notification is generated by the content store and is provided to the event broadcaster. The broadcaster then broadcasts the notification at step 306 to parties that have registered for that particular change notification. The interested parties receiving the notification may include one or more modules. The modules then analyze the notification message at step 308. Typically, they will compute the change between what is stored in its memory to what the change is within the content store. Modules are written specific to their application for performing a specific function. Modules are normally written by consumers/users of the content management system. However, the authors of the content management system may provide samples of modules to the consumers/users. In this way, the modules may have domain specific knowledge. Because they have domain specific knowledge and that they store the majority of the information within their own memory required to publish the content, the modules can efficiently analyze the interdependencies of the content. This allows for the modules to incrementally republish the content while allowing the content store to remain generic.

If the module wishes to update its memory, it may get the changed data from a content store itself or generate another event that is placed on the message queue and sent back to the broadcaster. This event may be a work message that is to be performed at a later time by the originating output module or could be a work message to be performed by another module on the bus. These work messages are then queued up within the event broadcaster and are then handled by the appropriate modules. As mentioned above, when processing the notification at step 308, one module may perform the analysis or one or more modules may perform the analysis.

At step 310, the broadcaster determines who is registered to receive the queued work messages and broadcasts those messages to the registered parties. The party or module to perform the work may be the module that initiated the original work event or may be another module connected to the bus. The interested modules then process the work messages and produce the output as appropriate at step 312. As mentioned above, this process and method allows for incremental changing of the published output by utilizing modules that retain all the data that is necessary to publish within its own memory. Thus, the output modules need only go to the content store upon startup and initialization or whenever there is a change within the content store to items of interest in order to publish the information. Work messages may pass between the output modules and the content manager. Certain work messages may in turn generate other work messages to other components of the content store system.

Modules all run in their own process and as such, they do not put each other at risk. For example, should one module go down or fail to perform, it does not affect any other modules on the message queue. If change notifications occur that are of interest to a particular module that goes down, they are queued up within the broadcaster and when the module goes back on line it receives those change notifications in the order in which they occurred.

By using modules, when a change occurs within the content store for a particular piece of content, it is a simple matter to compute what is affected by the change. The modules can schedule changed data for pieces of content that may need to be rebuilt. The modules may create the list of items within their own queue. Alternatively, the work may be coordinated between different modules by utilizing the message bus. As the change notifications are received, the output module may perform the work immediately or preferably places the work message it generates on the queue within its module and provides the work messages back to the broadcaster. Then, whoever is interested in that type of work request would receive that message from the broadcaster.

The present invention presents numerous advantages over traditional publishing systems. Using modules to output and publish information, the output can be created very quickly. The modules store all information that is needed to publish within its own memory. It does not have to go back to the content store to retrieve data to output as this information is already within the module. In particular, the module can do whatever is most efficient for the action at hand. More specifically, it could store only frequently used items, and perhaps get more rarely used items from the content store so as to conserve memory in the module. The module stores the right amount of information without being limited by the generic knowledge of the content management system designer. Additionally, multiple modules may be stacked together to provide different outputs and each of these modules may be placed on different machines or platforms. Modules may be allocated by a class of output such as XML or HTML, or they may be organized by any number of items of interest to a particular user.

Another advantage is that modules all run in their own process. They do not put one another at risk. As change notifications are received and broadcast by the broadcaster, they are queued up within the broadcaster. If a particular module crashes, the only thing lost is the output being generated at that moment. Any changes that were within that modules memory are then queued within the broadcaster. When the module restarts, the messages are then received by that module and the module begins processing to perform the work. As such, utilizing modules provides greater flexibility over a traditional publishing system.

Still further, each of the modules can be on separate machines, so that one can very inexpensively build a very high scale system. More specifically, the addition of any new output type need not put any significant tax on the existing content management system because new hardware can be easily added.

Utilizing modules with change notifications also allows you to easily provide incremental publishing. That is, instead of republishing entire pages of content, surgical changes may be made for content that is changed since the last publication time. This provides additional flexibility in that it gives users the option to republish as little or as much as they wish to do.

The present invention provides another advantage over conventional publishing systems in that less data traffic passes between the output modules and the content store. As noted above, upon startup and initialization, the modules load the content data from the content store. Then, as changes are made to the data, the content store provides an event or change notification that alerts the modules that a piece of information has changed. Conventional publishing systems would have to republish and reproduce the entire output and thus place a large volume of traffic on the data bus. Utilizing change notifications as disclosed above, the data traffic is greatly reduced because modules are receiving only information that has changed from the content store and not the entire volume of information required to produce the desired output.

The content management systems have been described herein with respect to use in the internet publishing space, for example. However, the same principles can also be applied to content management systems that would generate output suitable for use in traditional paper media, or CD volumes, or the like.

Alternative embodiments of the present invention become apparent to those skilled in the art to which it pertains upon review of the specification, including the drawing figures. The various computer systems and components shown in FIGS. 1–3 and described in the specification are merely exemplary of those suitable for use in connection with the present invention. Accordingly, the scope of the present invention is defined by the appended claims rather than the foregoing description.

We claim:

1. A method in a computer system for incrementally updating digital information on a computer network, comprising:

- issuing a change notification from a content store via a broadcaster to one or more modules, wherein the content store has digital information to be published on the computer network via the one or more modules, the one or more modules each storing a selective subset of the content store information, and wherein the change notification corresponds to a change in the content store information;
- receiving the change notification from the broadcaster in the one or more modules, at least one of the one or more modules being configurable to redistribute the change notification to another module to perform the associated change;
- initiating one or more events associated with the change notification by the one or more modules to selectively incrementally update the digital information stored in each of the one or more modules; and
- utilizing at least one of said one or more modules to generate one or more outputs formatted for visual presentation to a user, wherein said one or more output include a subset of the digital information.

2. The method as recited in claim 1, further comprising broadcasting the change notification to the one or more modules.

3. The method as recited in claim 1, wherein initiating the one or more events includes publishing the content subset.

4. The method as recited in claim 1, further comprising:
comparing the content store information associated with the change notification with the content subset in the one or more modules to determine a content change;
selectively updating the content subset with the content change in each of the one or more modules, and
publishing the content subset via said computer network in accordance with a platform-specific presentation format.

5. The method as recited in claim 1, wherein initiating the one or more events includes generating a work message by the one or more modules.

6. The method as recited in claim 1, further comprising registering for the change notification with the broadcaster.

7. A computer-readable medium having computer-executable instructions for performing the method recited in claim 1.

8. A computer system having a processor, a memory, and an operating environment, the computer system operable to execute the method recited in claim 1.

9. A computer system for incrementally updating digital content using change notifications on a computer network, comprising:
a content store that stores content data, wherein the content store generates change notifications associated with changes occurring with the content data;
one or more modules having a memory and configured to generate one or more outputs of at least a portion of the content data selected for visual presentation to a user, each of the one or more modules storing a selective subset of the content store information, wherein the one or more modules generate events associated with publishing the digital content on the computer network; and
a broadcaster transmitting the change modification from the content store to the one or more modules, at least one of the one or more modules being configurable to redistribute the change notification to another module to perform the associated change,
wherein the change notifications and events result in the selective incremental updating of the content data and content subset stored in each of the one or more modules.

10. The system as recited in claim 9, further comprising a broadcaster that receives the change notifications and events and broadcasts the change notifications and events to the one or more modules to result in the incremental updating of the content data.

11. The system as recited in claim 10, wherein the broadcaster includes a routing component that links the one or more modules to the change notifications and events.

12. The system as recited in claim 10, wherein the events include publishing the content subset.

13. The system as recited in claim 9, wherein the events include work messages.

14. The system as recited in claim 9, wherein the content store, the broadcaster and the one or more modules communicate using a message queue bus.

15. A method in a computer system for incrementally updating digital information on a computer network, comprising:
providing a content store, wherein the content store has digital information to be distributively published on the computer network, and wherein the content store is modified to change the contents stored thereon;
issuing a change notification, via a broadcaster, from the content store, wherein the change notification results in the selective incremental updating of the digital information via one or more modules, the one or more modules each storing a selective subset of the digital information, and wherein the chance notification corresponds to a change in the digital information;
receiving the change notification from the content store, via the broadcaster, in the one or more modules, at least one of the one or more modules being configurable to redistribute the change notification to another module to perform the associated change;
initiating one or more events associated with the change notification by the one or more modules to selectively incrementally update the digital information stored in each of the one or more modules; and
utilizing at least one of said one or more modules to generate one or more outputs formatted for visual presentation to a user, wherein said one or more output include a subset of the digital information.

16. The method as recited in claim 15, further comprising:
sending the change notification to the one or more modules; and
initiating one or more events associated with the change notification by the one or more modules to selectively incrementally update the digital information.

17. A computer readable medium having computer-executable instructions for performing the method recited in claim 15.

18. A computer system having a processor, a memory, and an operating environment, the computer system operable to execute the method recited in claim 15.

19. A method in a computer system for incrementally updating digital information published on a computer network, comprising:
providing one or more modules storing a selective subset of information stored in a content store, wherein the content store has digital information to be published on the computer network via the one or more modules;
receiving a change notification at the one or more modules, via a broadcaster, to indicate that the digital information has been modified, at least one of the one or more modules being configurable to redistribute the change notification to another module to perform the associated change;
initiating one or more events associated with the change notification by the one or more modules to selectively incrementally update the published digital information published via each of the one or more modules; and
utilizing at least one of said one or more modules to generate one or more outputs formatted for visual presentation to a user, wherein said one or more output include a subset of the digital information.

20. The method as recited in claim 19, wherein the change notification is issued from a content store, and wherein the content store has information to be published on the computer network.

21. The method as recited in claim 20, further comprising storing a subset of the content store information in the one or more modules.

22. A computer readable medium having computer-executable for performing the method as recited in claim 19.

23. A computer system having a processor, a memory, and an operating environment, with the computer system operable to execute the method recited in claim 19.

* * * * *

UNITED STATES PATENT AND TRADEMARK OFFICE

CERTIFICATE OF CORRECTION

PATENT NO. : 7,028,040 B1
APPLICATION NO. : 09/859986
DATED : April 11, 2006
INVENTOR(S) : Stephen John Butler et al.

It is certified that error appears in the above-identified patent and that said Letters Patent is hereby corrected as shown below:

In column 12, line 4, in Claim 15, delete "chance" and insert -- change --, therefor.

Signed and Sealed this

Twenty-fifth Day of August, 2009

David J. Kappos

*Director of the United States Patent and Trademark Office*